United States Patent [19]
Asama et al.

[11] Patent Number: 5,819,008
[45] Date of Patent: Oct. 6, 1998

[54] MOBILE ROBOT SENSOR SYSTEM

[75] Inventors: Hajime Asama; Hayato Kaetsu, both of Saitama; Shoji Suzuki, Osaka; Yoshikazu Arai, Saitama; Shin-ya Kotosaka, Tokyo; Isao Endo, Saitama, all of Japan

[73] Assignee: Rikagaku Kenkyusho, Saitama, Japan

[21] Appl. No.: 663,908

[22] Filed: Jun. 14, 1996

[30] Foreign Application Priority Data

Oct. 18, 1995 [JP] Japan ................................. 7-294780

[51] Int. Cl.⁶ ............................................ G05D 1/02
[52] U.S. Cl. ........................ 395/90; 395/93; 901/1; 901/46; 364/423.098; 364/424.037; 318/568.12; 318/568.16; 318/587
[58] Field of Search ................... 395/90, 93; 901/1, 901/46; 364/461, 423.098, 424.037; 318/568.12, 568.16, 587

[56] References Cited

U.S. PATENT DOCUMENTS

| 4,620,285 | 10/1986 | Perdue | 901/1 |
| 4,627,511 | 12/1986 | Yajima | 180/167 |
| 5,446,356 | 8/1995 | Kim | 901/1 |
| 5,448,290 | 9/1995 | Van Zeeland | 348/153 |
| 5,525,882 | 6/1996 | Asaka et al. | 318/568.16 |
| 5,652,489 | 7/1997 | Kawakami | 901/1 |

OTHER PUBLICATIONS

Malik et al., "The Infrared Detector Ring: Obstacle Detection for Autonomous Mobile Robot", IEEE Midwest Symposium for Circuits and Systems, Aug. 1992.

Primary Examiner—George B. Davis
Attorney, Agent, or Firm—Birch, Stewart, Kolasch & Birch, LLP

[57] ABSTRACT

An object of the present invention is to provide a sensor system which can effect local communications suitable for exchanging information to avoid collisions between mobile robots. The sensor system also prevents collisions between the mobile robots and obstacles. The system is well-suited for a multi-robot environment where multiple mobile robots operate. The system includes infrared signal transmitters installed in each of the multiple mobile robots for sending transmission data via infrared signals. The system further includes infrared signal receivers installed in each of the multiple mobile robots for receiving the transmission data sent by the infrared signal transmitters. Each mobile robot includes a control unit. The control unit prepares transmission information which includes mobile robot identification information unique to the mobile robot. The transmission information is included in the transmission data sent from the infrared signal transmitter. The control unit also extracts transmission information which is received by the infrared signal receiver.

20 Claims, 12 Drawing Sheets

|  | ID OF THE OTHER MOBILE ROBOT FROM WHICH SIGNAL WAS RECEIVED | | | | | | | |
|---|---|---|---|---|---|---|---|---|
|  | 0 | 1 | 2 | 3 | 4 | 5 | 6 | 7 |
| 0 | A | B | D | C | C | C | D | B |
| 1 | B | A | E | E | E | C | B | B |
| 2 | D | E | E | E | E | E | E | B |
| 3 | C | E | E | E | E | E | E | C |
| 4 | C | E | E | E | E | E | E | E |
| 5 | C | C | E | E | E | E | E | E |
| 6 | D | B | E | E | E | E | E | E |
| 7 | B | B | B | C | E | E | E | A |

(Row labels: ID OF TRANSMITTING/RECEIVING UNIT BY WHICH TRANSMISSION DATA WAS RECEIVED)

MOBILE ROBOT SENSOR SYSTEM

BACKGROUND OF THE INVENTION

1. Field of the Invention

The present invention relates to a sensor system, and more particularly to a sensor system for avoiding collisions between a mobile robot and other mobile robots, collisions of a mobile robot with obstacles, in an environment where multiple mobile robots conduct their operations (hereinafter such an environment wherein multiple mobile robots operate will be referred to as "multi-robot environment".

2. Description of the Related Art

In general, major types of tasks performed by mobile robots are the ones which are efficiently carried out by multiple robots each of which takes over a portion of the work, and an example of such types of the tasks includes cleaning inside buildings, transportation of objects and the like.

It is required that an individual mobile robot moves and conducts its operation while avoiding collisions with other mobile robots or obstacles in order that the operations are efficiently made by all the mobile robots in a multi-robot environment where the multiple mobile robots operate.

In these circumstances, to realize avoidance of collisions between robots, it is required to detect the presence of surrounding robots located at the places close to each other. In addition to the realization of such detection, it is further necessary for acquiring effective information to decide actions for avoiding a collision by each of the related mobile robots (i.e., information concerning movements such as advancing directions, speeds of the respective mobile robots and the like).

Heretofore, sensors or communications have been principally utilized as a means for acquiring the detection and the information as described above.

First, when sensors are employed, it is easily possible to detect the presence of mobile robots. However, there has been such a problem in that it is very difficult to obtain information as to the movements of the mobile robots which have been detected. More specifically, for acquiring effective information as to the movements of the mobile robots which have been detected by sensors, it is further required to process an analysis of moving situations of the mobile robots which have already been detected by sensors with the use of an image processing technique. It was, however, very difficult to conduct such analytical processing, as described above. To avoid collisions between the mobile robots.

While it has been also proposed to use active sensors wherein ultrasonic wave and the like are utilized, there arises a problem of interference of sensors themselves in such type of sensors.

For these reasons, it is considered that the use of communications is easier than that of sensors for the detection of the presence of mobile robots and the acquirement of information relating to movements of the respective mobile robots. Thus, there is the proposition of a method for avoiding collisions of mobile robots themselves by utilizing radio communications to exchange information as to positions of respective mobile robots, expectation for use of their trajectories and the like by the respective mobile robots.

However, since radio communications are large areal communications extending over a wide range of communication, there has been such a problem in that a communication load increases with increase in the number of mobile robots concerned.

OBJECTS AND SUMMARY OF THE INVENTION

The present invention has been made in view of the various problems as described above involved in the prior art. Accordingly, an object of the present invention is to provide a sensor system by which local communications suitable for exchanging information for avoiding collisions in mobile robots mutually can be carried out by taking note of the fact that collisions between mobile robots are due to those caused by the mobile robots located at places close to or near to each other, in other words, by a part of mobile robots existing under a multi-robot environment into a consideration.

The above described object is achieved by providing a sensor system for avoiding collisions between mobile robots as well as collisions between mobile robots and obstacles under a multi-robot environment where multiple mobile robots operate, comprising a means for sending infrared signals which is installed in each of the multiple mobile robots and sends transmission data by means of infrared signals; a means for receiving infrared signals which is installed in each of the multiple mobile robots and receives the transmission data sent by means of the aforesaid infrared sending means; a means for preparing transmission information which allows mobile robot identification information representing each mobile robot equipped with the infrared sending means to contain in the transmission data sent from the aforesaid infrared sending means; and a means for extracting reception information which acquires mobile robot identification information from the transmission data received by the aforesaid infrared receiving means.

More specifically, in the sensor system according to the present invention, it becomes possible to detect presence of mobile robots as well as that of obstacles, besides to conduct a local communication by the use of infrared communications. When luminous intensity of infrared signals is varied, a range where infrared signals reach can be limited to a certain distance, whereby local communications can be easily realized. Accordingly, the present invention has been made as a result of aiming at the points as discussed above.

Thus, according to the sensor system of the present invention, since a local communication is conducted by means of infrared communications, it becomes possible to exchange information for the movement as to other necessary minimum mobile robots with a low communication load.

While infrared communication systems for mobile robots which were developed for specified applications have been heretofore proposed, any of them could not be applied for the detection and to the communications for avoiding collisions between mobile robots as well as those of a mobile robot with obstacles. For instance, such an infrared communication system provided with a mechanism for rotating a communication device having directivity to find out other mobile robots to be communicated in the environment has been proposed. However, since such infrared communication system is provided with the mechanism for rotating a directional communication device, the system was not suitable for applying to avoidance of collisions where a detection operation extending over a wide range is required within a short period of time.

Furthermore, there is a problem in occurrence of interference in infrared communications, and in this connection, countermeasures against such occurrence of interference were not made in the prior infrared communication systems. On the contrary, it is possible to detect also interference in the sensor system according to the present invention.

In the following, a principle based on which presence of mobile robots as well as of obstacles can be detected by using infrared communications so that information as to movements of the moving robot is acquired as well as a principle for detection of interference will be described.

1. Principle for detecting mobile robots and obstacles by utilizing infrared communications.

Figure 1:
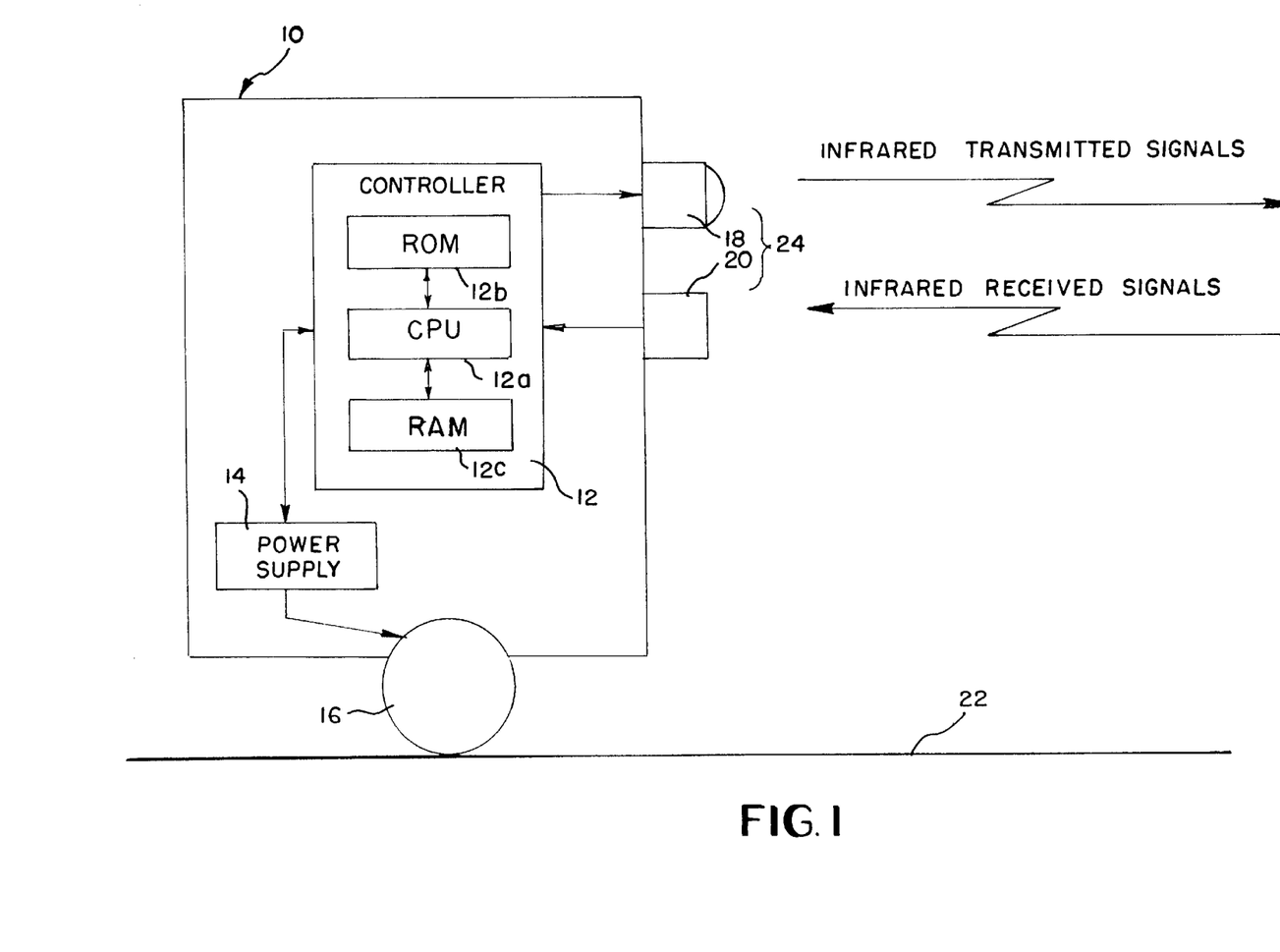
FIG. 1 is a constructional view, showing a mobile robot provided with the sensor system according to the present invention.

FIG. 1 is a constructional view, in its conception, showing a mobile robot provided with the sensor system according to the present invention wherein reference numeral 10 designates a mobile robot which controls a power supply 14 by means of a controller 12 composed of a central processing unit (CPU) 12a for controlling the whole operations of the robot, a read only memory (ROM) 12b for storing programs executed by the CPU 12a as well as data necessary, for processing these programs, a random access memory (RAM) 12c as the working area for the CPU 12a, and the like, thereby to rotate wheels 16 in an arbitrary direction or to stop the rotation thereof, so that movement in an arbitrary direction of the mobile robot and stoppage thereof are performed.

On the mobile robot 10 are mounted an infrared luminous element 18 as a means for sending infrared signals, and an infrared photoreceptive element 20 as a means for receiving infrared signals. The luminous element 18 and the photoreceptive element 20 are arranged so as to align directions of the optical axes thereof. Furthermore, the luminous element 18 is disposed so as to be capable of transmitting infrared signals in parallel to a floor 22 with a constant height.

A basic unit for transmitting and receiving infrared signals composed of such a pair of the luminous element and the photoreceptive element will be hereinafter referred properly to as "transmitting/receiving unit". Namely, a transmitting/receiving unit 24 is composed of the luminous element 18 and the photoreceptive element 20 in FIG. 1.

In these circumstances, a communicable range of the transmitting/receiving unit 24 is determined by luminous intensity of infrared signals sent from the luminous element 18, sensitivity in reception of infrared signals received by the photoreceptive element 20, and directivities of the luminous element 18 and the photoreceptive element 20, respectively.

It is assumed herein that all the mobile robots 10 in a multi-robot environment are provided with the above described transmitting/receiving units 24, respectively, and a unique identification number is given to each of the mobile robots 10 as mobile robot identification information. Hereinafter, such identification number will be referred to as "robot ID" in the present specification.

The controller 12 functions as the means for controlling the power supply 14 as described above. At the same time, the controller is adapted to also function as a means for preparing transmission information so that the controller 12 controls the luminous element 18 in the transmitting/receiving unit 24 of each mobile robot 10 so that it outputs always infrared signals loaded with information indicating its own robot ID. Furthermore, the controller 12 is adapted to function also as a means for extracting reception information so that the controller 12 controls the photoreceptive element 20 so such that information indicating a robot ID contained in infrared signals received by the photoreceptive element 20 is extracted to acquire the robot ID.

Accordingly, the mobile robot 10 moves in such a manner that the robot sends always its own robot identification number by means of the luminous element 18, and at the same time it checks other robot IDs contained in the infrared signals received by the photoreceptive element 20.

Figure 2A:
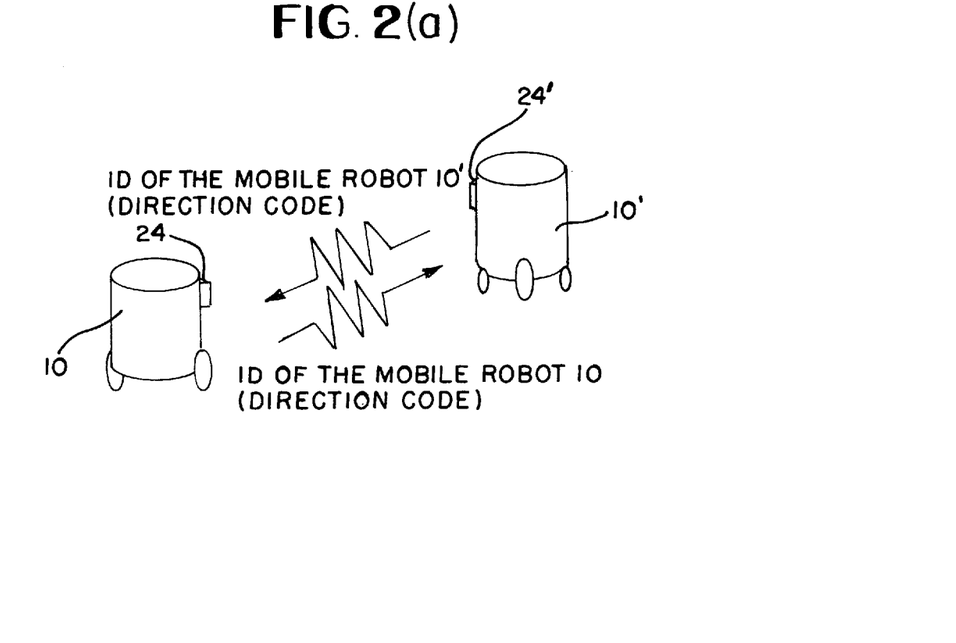
Figure 2B:
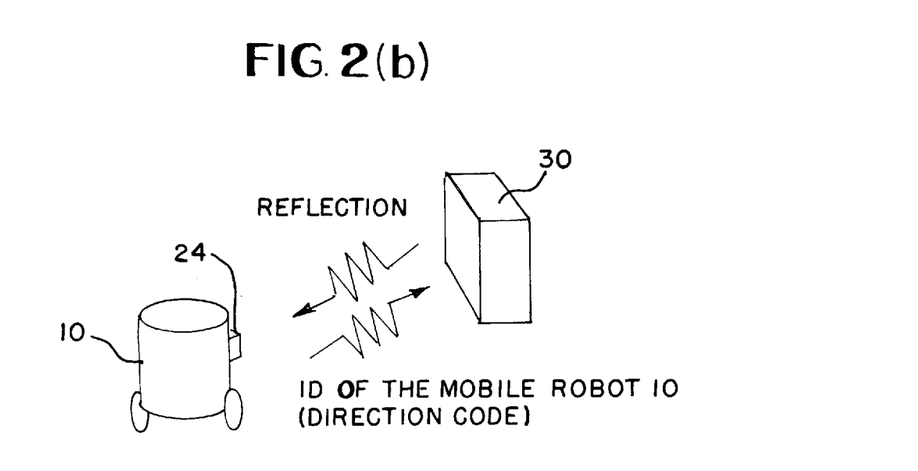
FIG. 2(b) shows a case of the presence of the obstacle.

In this condition, the mobile robot 10 can detect the presence of another robot 10' as well as the presence of an obstacles 30, as a result of recognizing a robot ID from the infrared signals received as shown in FIGS. 2(a) and 2(b), respectively.

More specifically, in the case where another mobile robot (the mobile robot 10') different from its own robot (the mobile robot 10) exists within a communicable range, since a different robot ID (the robot ID sent from the luminous element in a transmitting/receiving unit 24' of the mobile robot 10') is received by the photoreceptive element 20 in the transmitting/receiving unit 24 of its own (mobile robot 10), presence of the different mobile robot (mobile robot 10') different from its own (mobile robot 10) can be detected by recognizing a different robot ID (the robot ID of the mobile robot 10') from that of its own (mobile robot 10) (FIG. 2(a)).

On the other hand, in the case where the obstacle 30 exists within a communicable range, the infrared signals sent from the luminous element 18 in the transmitting/receiving unit 24 of its own (mobile robot 10) are reflected by the obstacle 30 and returned so that its own robot ID belonging to itself (the mobile robot 10) is received by the photoreceptive element 20 in the transmitting/receiving unit 24 of its own (mobile robot 10), whereby detection of the obstacle 30 becomes possible (FIG. 2(b)).

The method to detect the presence of another robot or an obstacle can be extended to a case to detect the presence of multiple robots and/or multiple obstacles.

In the meantime, a range in which detection of mobile robots and obstacles is possible is determined by a communicable range of the transmitting/receiving unit 24. Accordingly, when each of mobile robots is provided with multiple transmitting/receiving units 24 with taking a directivity of the transmitting/receiving unit 24 into consideration, it becomes possible to omnidirectionally detect the other mobile robots and obstacles by each of the mobile robots.

In this case, it is arranged in such that a unique number representing identification information for indicating a direction in the movement of each mobile robot as well as identification information for indicating a moving speed in the movement of the mobile robot are given to the transmitting/receiving unit 24 installed on the mobile robot as the information relating to the movement of the mobile robot. In the case where the unique number is specified as to the identification information indicating a moving direction, it is specified, for example, in response to an angle defined by a direction of the optical axis of the transmitting/receiving unit 24 and the advancing direction of a mobile robot, and the number thus determined will be referred to in the present specification as "direction ID". Furthermore, concerning identification information indicating a moving speed, it is specified in such that a number from 0 to 3, for example, is given to moving speeds from 0 to 30 [cm/sec.] of a mobile robot in every 10 [cm/sec.], and the number thus determined will be referred to herein as "speed ID".

In this case, the controller 12 functioning as a means for preparing transmission information controls the luminous element 18 in the transmitting/receiving unit 24 of each mobile robot 10 so as to output always infrared signals containing its own robot ID together with information indicating the direction ID and the speed ID. On the other hand, the controller 12 functioning as a means for extracting reception information extracts a robot ID as well as information indicating a direction ID and a speed ID of the other mobile robot contained in the infrared signals received by the photoreceptive element 20 to obtain the robot ID.

Hence, each of the mobile robots 10 moves always while sending its own robot ID as well as the direction ID and the speed ID and at the same time, while checking each robot ID as well as each direction ID and each speed ID of other mobile robots.

As a result, since a certain mobile robot 10 recognizes a robot ID of another mobile robot 10' from the infrared signals received as in manners illustrated in FIGS. 2(a) and (b), presence of the other mobile robot 10' and that of an obstacle 30, besides both the mobile robots which have established communications between them (the mobile robots 10 and 10') can recognize the relationships between them concerning both the moving headings and speeds after the direction IDs and the speed IDs were recognized by both the mobile robots 10 and 10' from the infrared signals received by themselves, respectively.

In other words, a combination of a direction ID acquired together with the robot ID from the other party by a mobile robot on the receiving side and the direction ID with respect to the transmitting/receiving unit by which infrared signals were received corresponds to a combination of moving headings of both the mobile robots in a one-to-one relationship. The information of the moving headings as well as that of speeds are the ones for judging such a situation that either the both robots are going to be close to each other or to be apart from one another, and that they are going to move in how much speed, so that they are the effective information for deciding actions for avoiding collisions of both the robots.

2. Principle for detecting interference

For instance, if three or more mobile robots are crowded in a narrow range, there is a fear of impossible communication as a result of interference of infrared signals sent from luminous elements 18 of the respective mobile robots. In such a case, if the above described interference of infrared signals can be detected, the respective mobile robots can detect the fact to the effect that there are closely two or more mobile robots exclusive of its own mobile robot.

In the present invention, coding for data to be sent is proposed to detect interference of infrared signals.

Figure 3A:
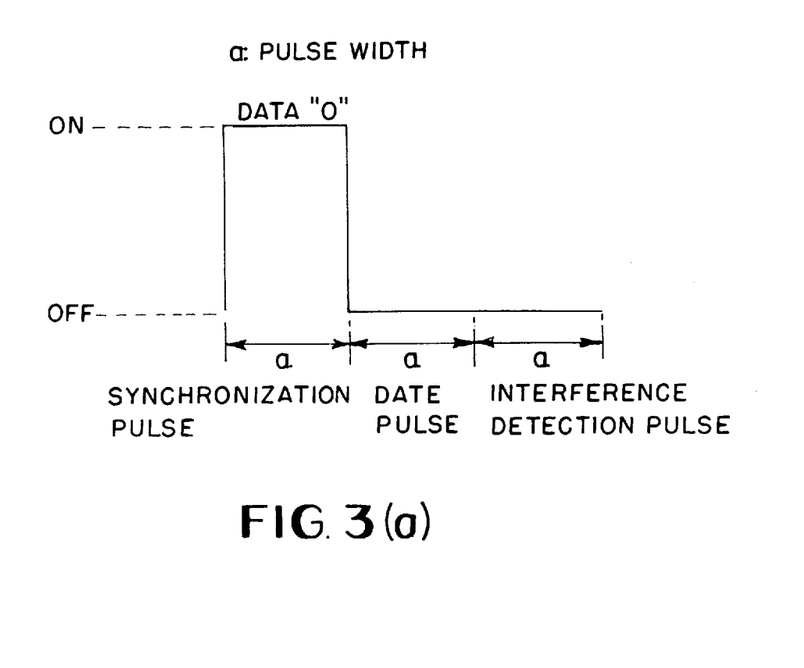
FIG. 3(a) shows a case where data is "0", and FIG. 3 (b) shows a case where data is "1", respectively.
Figure 3B:
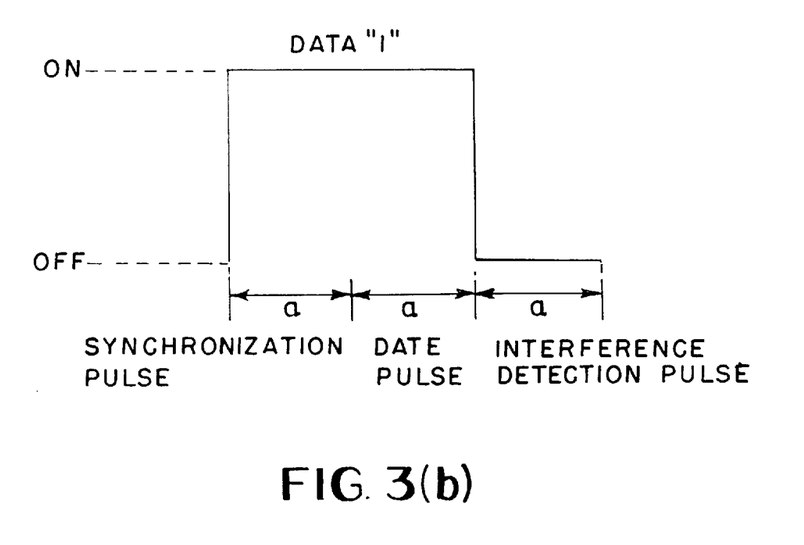

Namely, the transmission data such as robot ID as the information for identifying a mobile robot, direction ID as the information for identifying moving direction, and the like are binarized to represent 1 bit by ON/OFF of a pulse having a constant width in the present invention as shown in FIGS. 3(a) and 3(b). In this case, another pulse having the same pulse width as that described above is added before and behind the former pulse, whereby 1 bit is represented by three pulses.

Among these three pulses, the first pulse utilizes ON pulse and this is for synchronization pulse of data reception. The second pulse is data pulse for indicating the contents of data sent wherein ON pulse is used in case of "1 ", while OFF pulse is used in case of "0". Furthermore, the third pulse uses OFF pulse, and this third pulse is employed as a pulse for detecting interference. Under the circumstances, reception of data sent is conducted by observing synchronization pulses, data pulses, and pulses for detecting interference which appear periodically.

Figure 4:
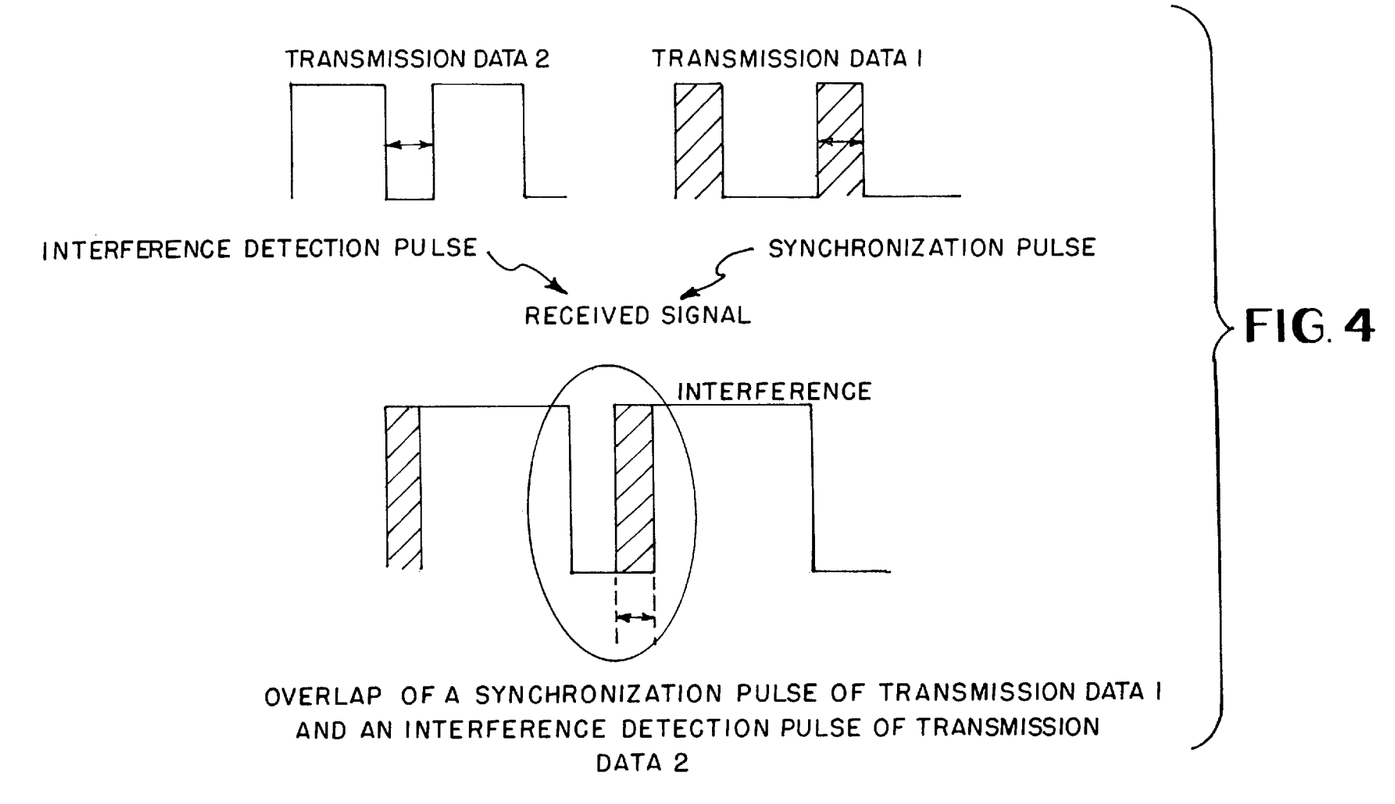
FIG. 4.is an explanatory view illustrating a principle for detecting interference of transmission data.

In case of occurring interference, signals wherein respective data sent are overlapped are observed on the reception side, and in this case synchronization pulse contained in one of data sent (transmission data 1) becomes overlapped with pulse for detecting interference of further data sent (transmission data 2) (see FIG. 4).

Thus, when a block wherein the synchronization pulse overlaps with the pulse for detecting interference is observed, occurrence of interference can be detected.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIGS. 2(a) and 2(b) are conceptional views for explaining a principle for detecting the presence of another mobile robot, as well as the presence of an obstacle wherein FIG. 2(a) shows a case of detecting the presence of the other mobile robot, while

FIGS. 3(a) and 3(b) are explanatory views each illustrating a manner for coding transmission data wherein

FIGS. 13(a) and 13(b) are diagrams showing experimental results of the measurement of communicable ranges wherein FIGS. 14(a) and 14(b) are diagrams showing experimental results of the measurement of detection ranges wherein

DETAILED DESCRIPTION OF THE PREFERRED EMBODIMENTS

An example of the sensor system according to the present invention in a manner for embodying the same will be described hereinafter by referring to the accompanying drawings.

1 . Detailed construction of transmitting/receiving unit
First of all, further detailed explanation will be made on the transmitting/receiving unit 24 which has been described in conjunction with FIGS. 1 and 2.

Meanwhile, it has been known that outdoor light such as sunlight, illumination and the like becomes noise in infrared communications.

Accordingly, to accommodate occurrence of such noise, it is arranged in the transmitting/receiving unit 24 that the infrared signals modulated by a frequency of 38 KHz are used as transmission media.

It is to be noted that a manner for utilizing the infrared signals modulated by 38 KHz frequency as the transmission media is also applied to an infrared remote control for TV and the like, and dedicated devices are also available on the market. Particularly, a 38 KHz band pass filter, an amplifier and the like have been previously installed in a photoreceptor device used for infrared remote control of TV and the like which is sold on the market, so that a reception circuit can simply be constituted. Therefore, when such a photoreceptor device available on the market is employed as the photoreceptive element 18 in the transmitting/receiving unit 24, reduction of cost in case of manufacturing the transmitting/receiving units 24 can be attained.

Figure 5:
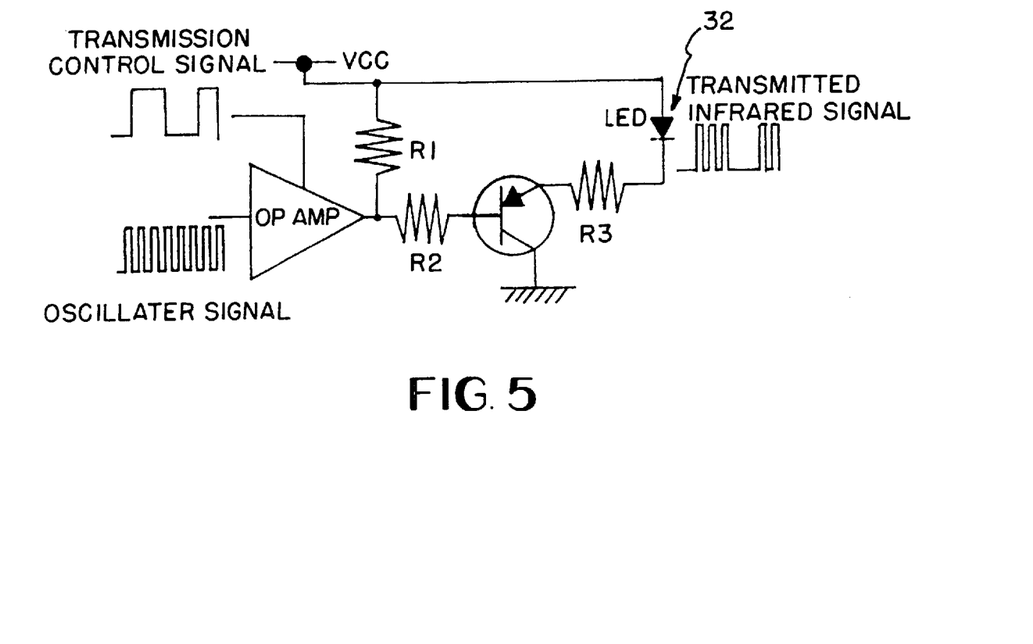
FIG. 5 is a circuit diagram for controlling emission of an infrared light emitting diode in the case where the infrared light emitting diode is used as the luminous element in a transmitting/receiving unit.

Moreover, for example, an infrared light emitting diode may be used as the luminous element 20 in the transmitting/receiving unit 24, and for controlling light emission in the infrared light emitting diode, for example, a circuit shown in FIG. 5 may be used.

In the circuit shown in FIG. 5, luminous intensity of the infrared light emitting diode 32 can be varied in accordance with a resistance R3 in FIG. 5, and it is arranged in the present manner for embodiment that a distance in which infrared signals reach is fixed to 1.2 meter. It is desirable to determine such infrared reachable distance with taking a moving speed of a mobile robot 10 equipped with the transmitting/receiving unit 24 into consideration. In this connection, it is set in the present manner for embodiment that a moving speed of the mobile robot 10 is 0.3 m/sec.

2. The whole structure of sensor system

In the present manner for embodiment, the transmitting/receiving units 24 each composed of the luminous element 18 and the photoreceptive element 20 are disposed so as to have directivity of about 45 degrees, respectively, to detect omnidirectionally presence of mobile robots 10 by a small number of the transmitting/receiving units 24 as less as possible in view of reduction in cost.

Figure 6:
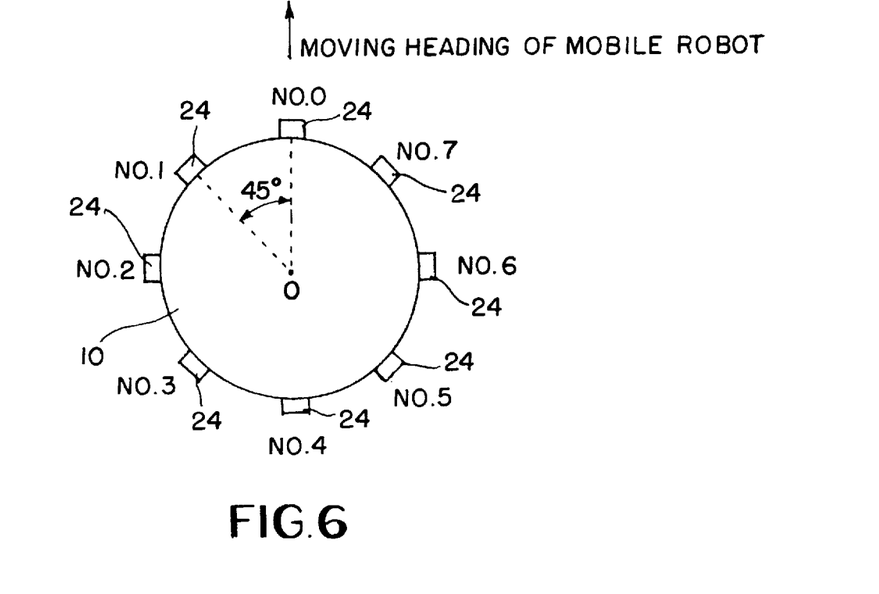
FIG. 6 is an explanatory view showing an arrangement of transmitting/receiving units on a mobile robot, as well as, the direction IDs allocated to the units, respectively.

Accordingly, as shown in FIG. 6, eight transmitting/receiving units 24 are disposed on the circumference of a mobile robot 10 in such that these transmitting/receiving units are arranged at regular intervals around the center O with an angle of 45 degrees, respectively. This angle of 45 degrees is basically defined by one of the transmitting/receiving units 24 (No. 0) the moving heading of which coincides with the moving direction of the mobile robot 10 and the adjacent counterclockwise transmitting/receiving unit 24 (No. 1) as shown in FIG. 6. Thus, a detection range of the transmitting/ receiving units 24 can be extended omnidirectionally (360 degrees) around the mobile robot 10.

The direction IDs sent from the luminous elements 18 in the respective transmitting/receiving units 24 are allocated as shown in FIG. 6, in such that to one of the transmitting/receiving units 24, the moving heading which coincides with the moving direction of the mobile robot 10 is allocated always No. 0, and then to the other transmitting/receiving units 24 are allocated counterclockwise the direction IDs from No. 1 to No. 7 in order, respectively.

In the present manner for embodiment, the transmission data sent from each of the transmitting/receiving units 24 contain a robot ID which has been previously given to each of them and direction IDs which have been previously given to eight transmitting/receiving units 24 installed in each of the mobile robots 10.

Coding of transmission data is carried out in accordance with the manner described in the paragraph "2. Principle for detecting interference" in the above described "Objects and Summary of the Invention".

Namely, transmission data composed of a robot ID and a direction ID is binarized, and in this case 1 bit is represented by ON/OFF of a pulse having a constant width. Furthermore, a pulse having the same pulse width is added before and behind the former pulse so that 1 bit is represented by three pulses.

Among these three pulses, the first pulse utilizes ON pulse and this is for synchronization pulse of data reception. The second pulse is data pulse for indicating the contents of data sent wherein ON pulse is used in case of "1", while OFF pulse is used in case of "0". Furthermore, the third pulse uses OFF pulse, and this third pulse is employed as a pulse for detecting interference (see FIG. 3(a) and (b)).

Figure 7:
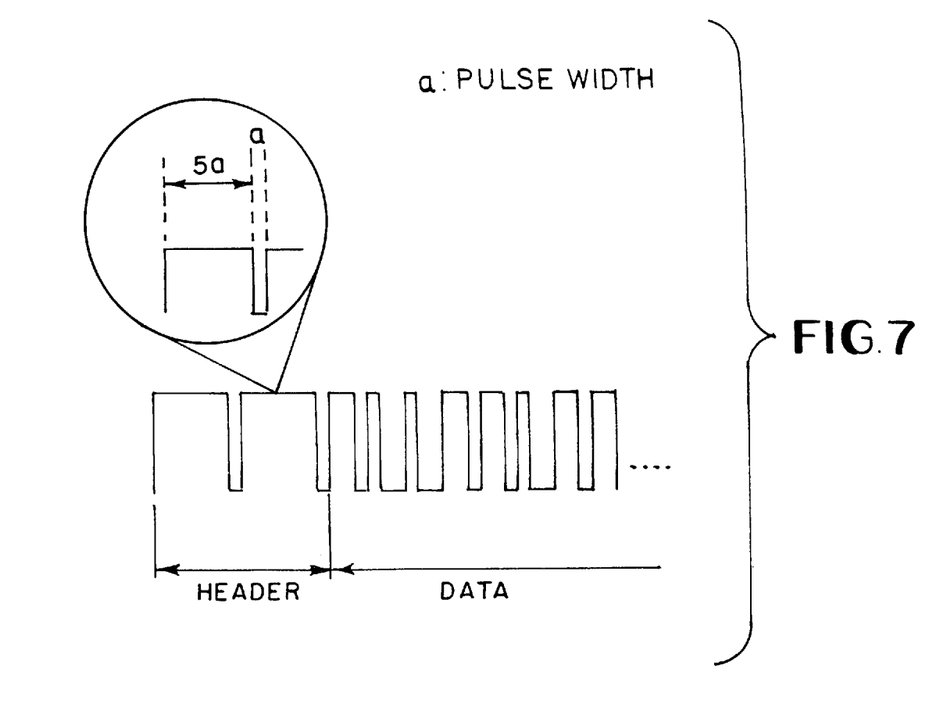
FIG. 7 is an explanatory view showing transmission data to which is added a header.

In this case, however, a frame to which is added a header is formed so as to be capable of discriminating clearly delimiter of data on the reception side as shown in FIG. 7. The transmission data thus coded is modulated by an operational amplifier in the circuit shown in FIG. 5, and then sent from the infrared light emitting diode 32.

In this case, coding of transmission data and analysis for input signal is performed by controlling the program in a software so as to be capable of changing flexibly the contents to be processed.

More specifically, in the example shown in the constructional diagram, of a mobile robot equipped with the sensor system according to the present invention which is presented as FIG. 1 for explaining the principle of the invention, the CPU 12a of the control section 12 acts in accordance with the program stored in the ROM 12b of the control section 12 to perform the processing of coding for transmission data sent from the luminous element 18, as well as, to analyze input signal received by the photoreceptive element 20.

It is to be noted that the construction of the present invention is not limited to the example shown in FIG. 1 wherein the processing for coding of transmission data and analysis of input signals, as well as, the controlling for the mobile robots 10 are performed by the single control section 12, but the construction which will be described hereunder may be utilized in the case where eight transmitting/receiving units 24 are involved as shown in FIG. 6.

Namely, a controller for transmitting/receiving units 24 (hereinafter referred to as "transmitting/receiving unit controller") and a controller for a mobile robot 10 (hereinafter referred to as "mobile robot controller") may be separately provided.

Figure 8:
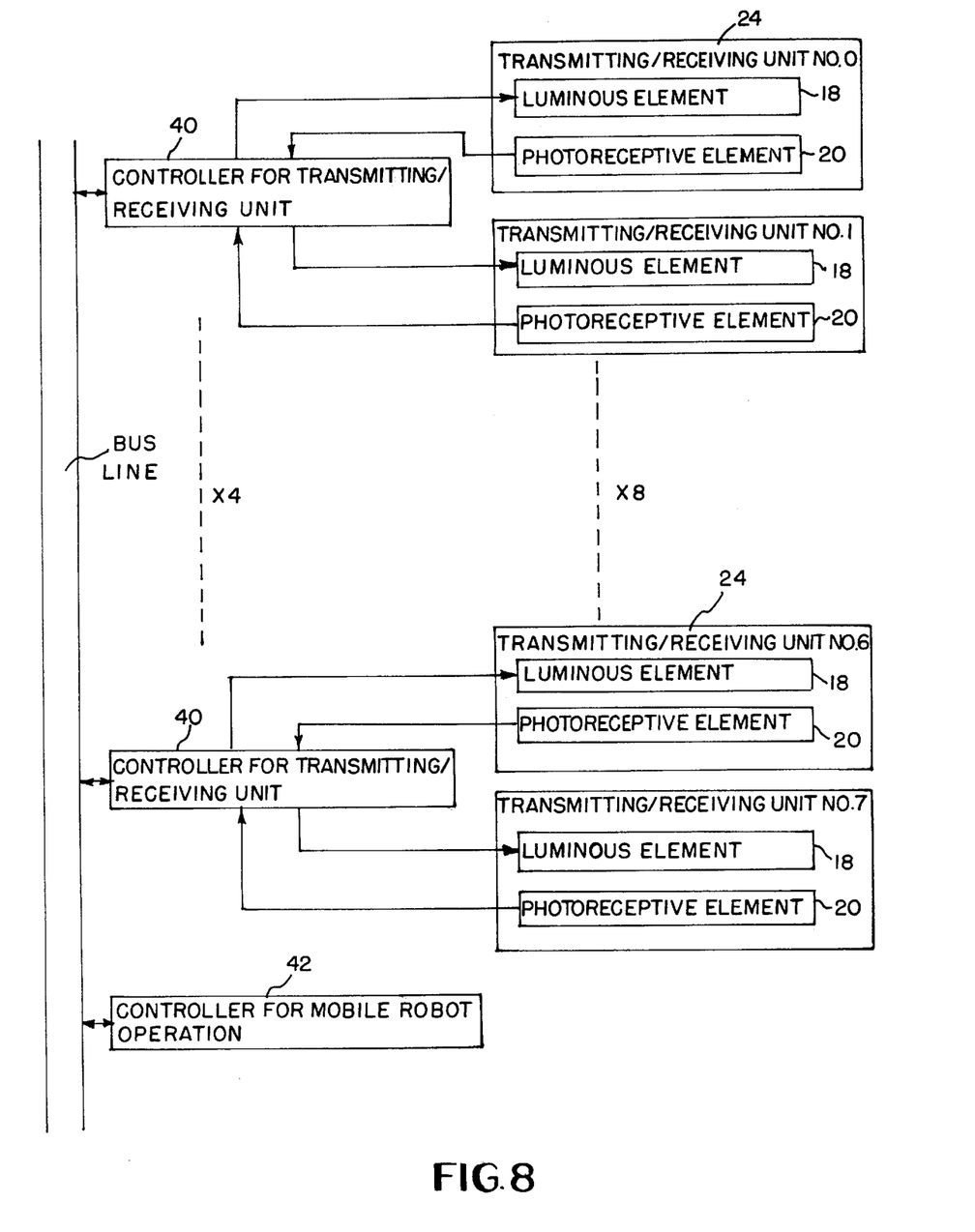
FIG. 8 is a block constructional diagram showing a construction of the control system of a transmitting/receiving unit.

For instance, as shown in FIG. 8, two of the transmitting/receiving units 24 are controlled by one transmitting/receiving unit controller 40, so that eight transmitting/receiving units are controlled by four of the transmitting/receiving unit controllers 40. While a mobile robot controller 42 is provided for controlling a mobile robot 10.

In the following, an example for controlling collision avoidance executed by the controller 12 or the transmitting/receiving unit controllers 40 as well as the mobile robot controller 42 will be described.

In the description for the above example, it is assumed that a robot ID, a direction ID shown in FIG. 6, and a speed ID are sent from a luminous element 18, and only one set of transmitting/receiving units among eight sets of the transmitting/receiving units 24 can receive transmission data at the same time. In other words, it is assumed that an obstacle and a mobile robot exist only in one direction at the same time.

Figure 9:
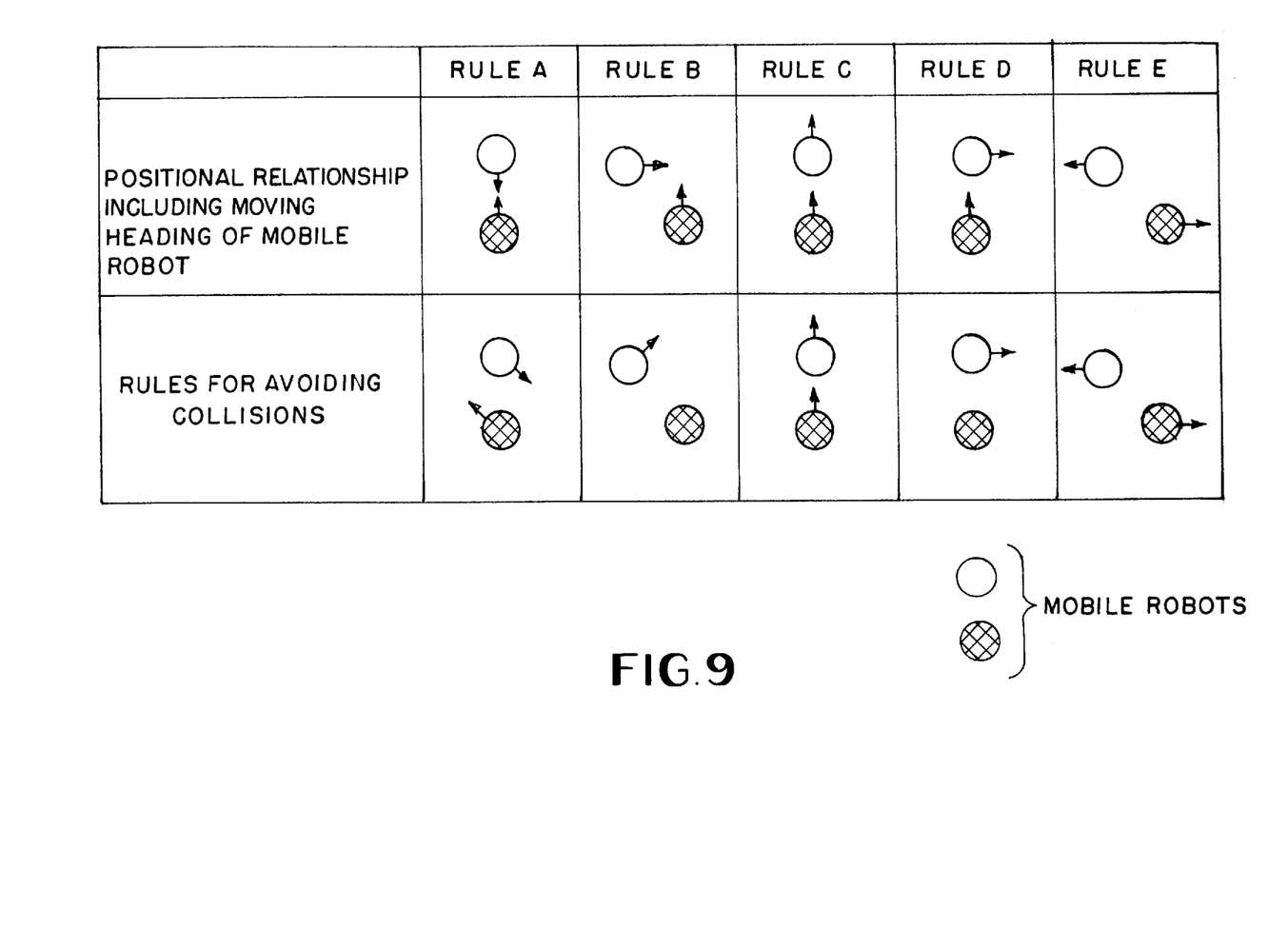
FIG. 9 is a table illustrating rules for avoiding collisions with respect to typical patterns of collision.

The Table of FIG. 9 shows a manner for controlling collision avoidance by utilizing transmission data with respect to typical patterns of collision. The controlling manner for collision avoidance illustrated in FIG. 9 is composed of five rules from A to E, inclusive. Collision avoidance is executed on the basis of these rules.

In the following, five rules are described in detail by referring to FIG. 9 wherein the upper column indicates positional relationships including each moving heading of mobile robots detected by the photoreceptive element 20 in the transmitting/receiving unit 24, while the lower column indicates the rules for collision avoidance.

The contents of these rules are as follows.

Rule A = Both the mobile robots change their trajectories.

Rule B = One of the mobile robots changes its trajectory, and another mobile robot stops.

Rule C = When the other mobile robot advances ahead in the same direction as that of a mobile robot, the one keeps pace with the other.

Rule D = One of mobile robots requires no avoidance, while the other mobile robot stops.

Rule E = Both the mobile robots require no avoidance.

In the above described rules for avoiding collisions, a priority of stoppage, has been previously determined in both the rules B and D, respectively.

In the present mode for embodiment, since eight transmitting/receiving units are mounted to the sensor system loaded in a mobile robot as described above, there are inputs in eight directions with respect to the sensor system loaded in the mobile robot, so that there are sixty-four types of positional relationships between two mobile robots. Suitable rules including rules A through E are applied to all the sixty-four patterns in the forms of changing the trajectory, stopping itself, keeping pace with the other, and requiring no avoidance.

Figure 10:
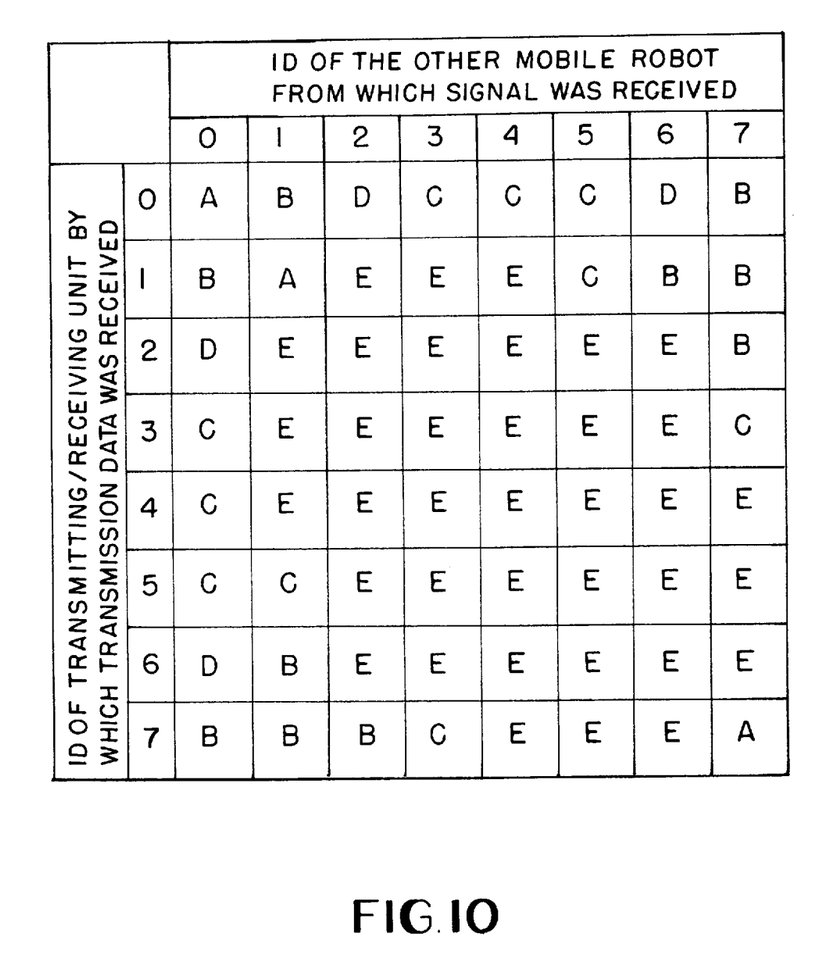
FIG. 10 is a table showing a rule matrix.

A rule matrix prepared as described above is shown in FIG. 10 wherein IDs of a transmitting/receiving unit which has received transmission data are indicated in the row directions of the table, while direction IDs received of the other mobile robot are indicated in the line directions of the table, and in this case, the collision avoidance rules (rules A through E) illustrated in FIG. 9 are shown as the respective elements.

If the other party is an obstacle or a stopping mobile robot, it becomes possible to realize avoidance of collisions by applying the rule D shown in FIG. 9.

To confirm the effectiveness of the above described rules for collision avoidance, experiments for collision avoidance are conducted by applying the collision avoidance rules to a so-called three-wheeled steering type mobile robot, and the results obtained are shown hereinafter.

In this case, it is assumed that coordinates of the goal have been previously afforded to a mobile robot, and if there is no reception by any of the eight transmitting/receiving units loaded in a mobile robot, the robot moves always to the goal. Under the circumstances, in the case when transmission data was received, collision avoidance with respect to an obstacle was carried out when the robot ID received by a mobile robot is its own robot ID, while collision avoidance with respect to a mobile robot is executed when the robot ID received belongs to another mobile robot.

Figure 11:
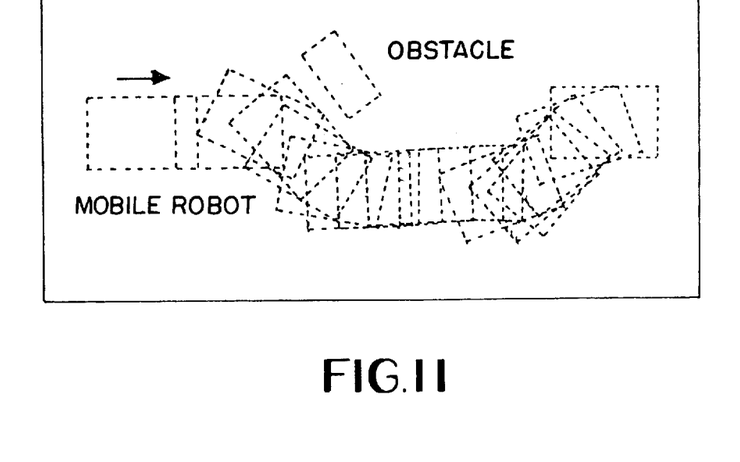
FIG. 11 is a graphical representation indicating an experimental result of avoiding a collision of a mobile robot with an obstacle.

First, the experimental result of collision avoidance of a mobile robot and an obstacle will be described wherein the goal of the mobile robot was determined three meters ahead therefrom, and an obstacle was disposed between the mobile robot and the goal.

The result of the above described experiment is indicated in FIG. 11 which was obtained by recording positions of the mobile robot at intervals in every 5 seconds and plotting the same as the locus of the mobile robot wherein the mobile robot starting from the left hand in the figure detects an obstacle, so that the mobile robot changes its own trajectory to the right hand, whereby a collision is avoided.

Figure 12:
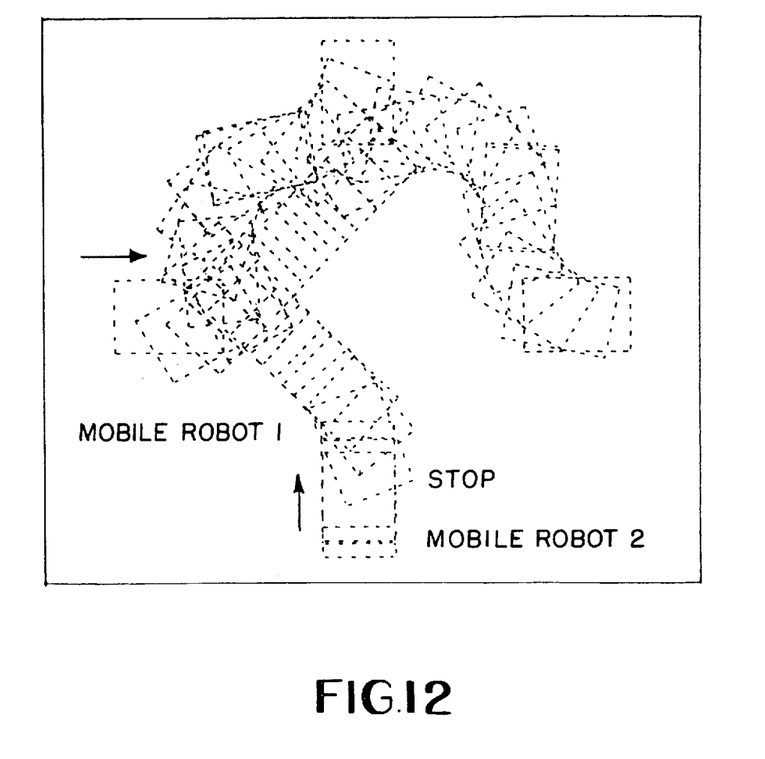
FIG. 12 is a graphical representation indicating an experimental result for avoiding a collision between two mobile robots.

Then, the experimental result of collision avoidance occurred between two mobile robots will be described wherein the goals of the respective mobile robots are fixed 2.5 meters ahead therefrom, respectively, and it is arranged in such that both the mobile robots shall collide with each other at an angle of 90 ° before they reach the respective goals.

The result of the above described experiment is indicated in FIG. 12 which was obtained by recording positions of each mobile robot at intervals in every 5 seconds and plotting the same as the locus of each of the mobile robots as in FIG. 11 wherein a mobile robot 1 recognizes presence of a mobile robot 2, so that the mobile robot 1 changes its own trajectory to the left hand with taking such fact that the priority of the mobile robot 2 is lower than that of the mobile robot 1 and hence, the mobile robot 2 shall be stopped into consideration, and then the mobile robot 1 continues its collision avoidance action. While the mobile robot 2 recognizes presence of the mobile robot 1 to stop its own movement, and the mobile robot 2 directs to the goal after the mobile robot 1 moves past the same. From this experimental result, it has been found that such collision avoidance with taking action of the other party into consideration can be realized.

Furthermore, the experimental results of the following two items in the basic properties involved in the above described sensor system by means of infrared communications according to the present invention will be explained hereunder:

(a) Measurement for communicable range (b) Measurement for detection range of obstacle In this case, transmission data used are those obtained by representing robot ID, direction ID, and speed ID with 8 bit, and then coding them.

Figure 13A:
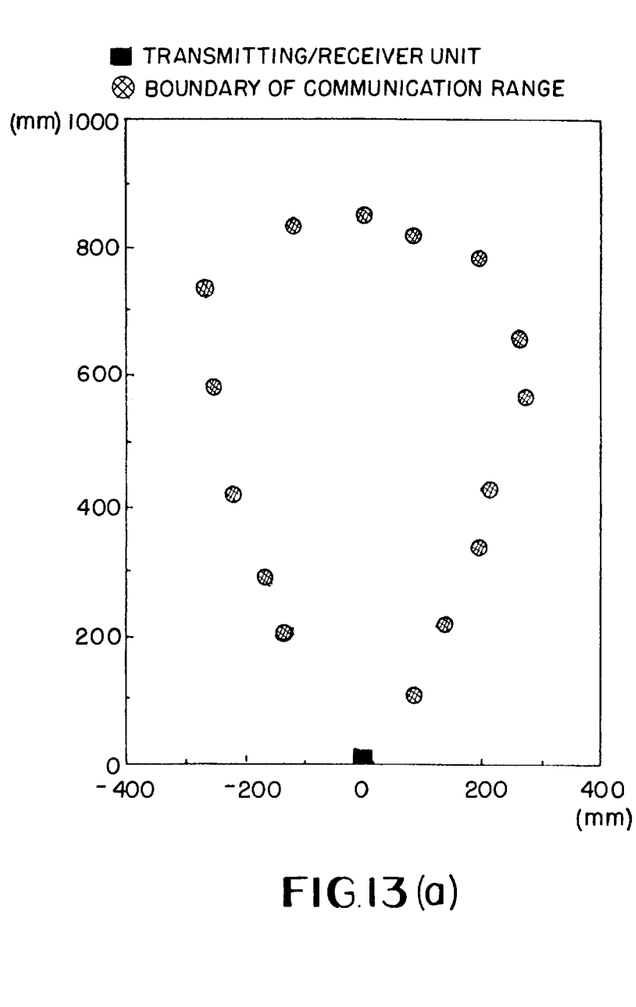
FIG. 13(a) shows a measured result in a communicable range of one transmitting/receiving unit contained in a fixed sensor system.
Figure 13B:
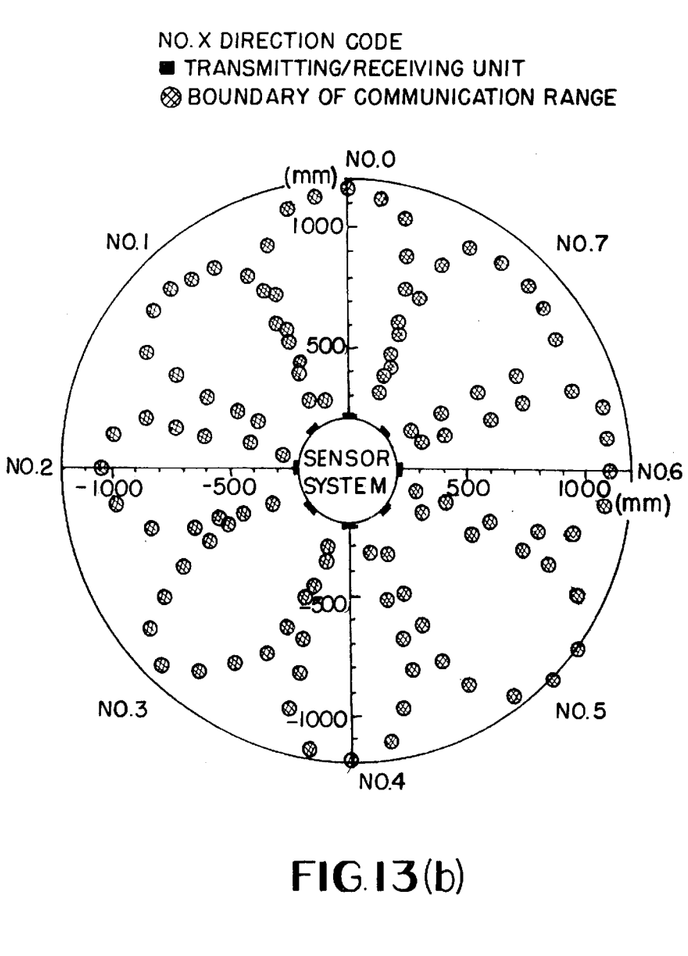
FIG. 13(b) shows a measured result in a communicable range of a sensor system.

First, the measurement for a communicable range will be described. A sensor system containing eight transmitting/receiving units installed in a mobile robot as described above is secured, and one more transmitting/receiving unit is prepared separately from the sensor system. In this condition, reception data is observed while moving this one transmitting/receiving unit, whereby the communicable range is measured.

It is to be noted that the communicable range is defined herein as that where all the ten data received in succession are equal to the transmission data.

The result of measurement for communicable range of a certain transmitting/receiving unit contained in the secured sensor system is shown in FIG. 13(a) wherein the plot indicates the boundary of communication range. Moreover, a communicable range of the sensor system according to the present invention is shown in FIG. 13(b).

As a result of experiment, it has been confirmed that the sensor system according to the present invention can be received within the omnidirectional range (360 degrees) in a distance of from about 100 cm to 120 cm.

Thus, when another mobile robot provided with the same sensor system approaches to the above described range, presence of such mobile robot can be confirmed by recognizing the robot ID involved therein.

Figure 14A:
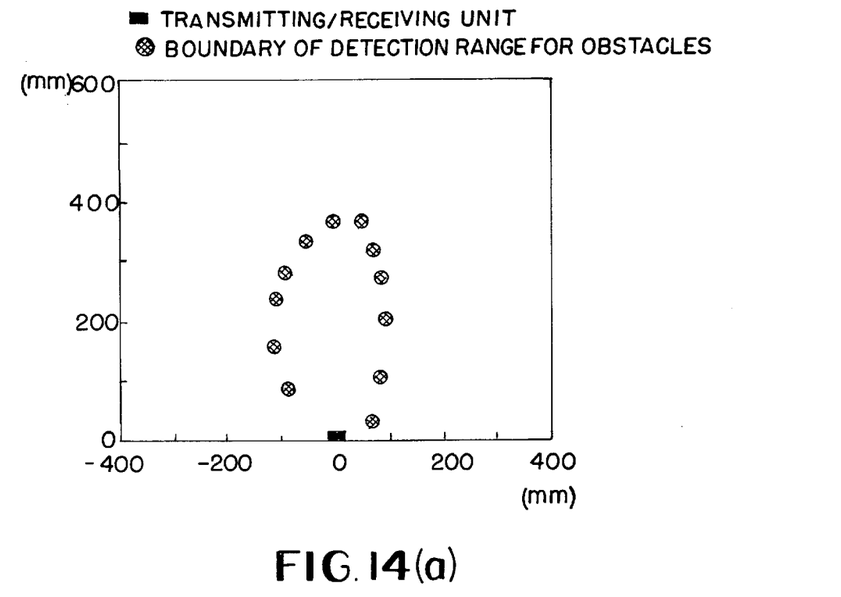
FIG. 14(a) shows a detection range for an obstacle in one transmitting/receiving unit contained in a fixed sensor system.
Figure 14B:
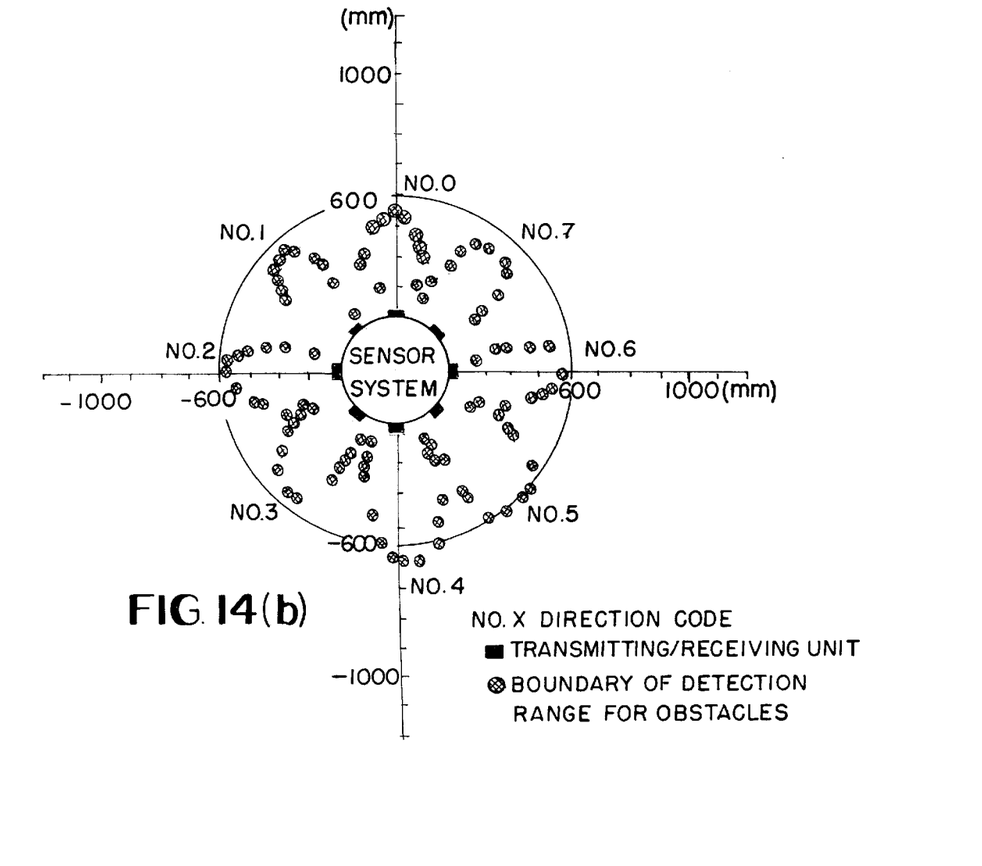
FIG. 14(b) shows a detection range for an obstacle in a sensor system.

Then, measurement for detection range of an obstacle will be described. As in the case of the above described measurement for communication range, a sensor system prepared by installing eight transmitting/receiving units in a mobile robot is secured, and an obstacle is allowed to move in place of the transmitting/receiving unit, whereby a detection range for the obstacle is measured.

A white paper having A4 size is employed as an obstacle, and it is allowed to move while confronting the white paper right in front of the transmitting/receiving unit.

Under the circumstances, when the same data as that of the transmission data are received, it may be considered that the infrared signals outputted from the luminous element 18 return as a result of reflection by the obstacle, whereby detection for the obstacle can be effected.

As in the case of the measurement for communication range, a range wherein ten data received in succession are compared with the transmission data, so that 100% of the same data can be received was observed.

The detection range for an obstacle of a certain transmitting/receiving unit contained in the secured system is shown in FIG. 14(a) wherein the plot indicates a boundary for the detection range of the obstacle. Moreover, the detection range of an obstacle in the sensor system according to the present invention is shown in FIG. 14(b).

As a result of the experiment, it has been confirmed that an obstacle existing in any direction can be recognized within a distance from about 40 cm to 60 cm so that the sensor system is available as a proximity sensor.

The reason for the narrower detection range of an obstacle, in comparison with the communicable range, is that the infrared signals reflected by the obstacle are weaker than the infrared signals outputted directly from the luminous element 18 in the transmitting/receiving unit 24.

As described above, the detection range for an obstacle is narrower than that of mobile robots, because the infrared signals reflected by an obstacle are weaker than that sent from the other mobile robots. However, because of this result, interference of the infrared signals which were outputted from its own mobile robot and reflected by the other mobile robot with the infrared signals sent from the very other mobile robot is avoided in case of detecting mobile robots. As a consequence, it becomes possible to conduct both the detection for an obstacle and that for mobile robots.

Namely, the following conditions are required for avoiding collisions in an environment for moving multiple robots:

(a) Detection for an obstacle being at rest
(b) Detection for a moving obstacle
(c) Detection for the other mobile robots The sensor system according to the present invention can effect the detection for an obstacle being at rest and the detection for the other mobile robots among those enumerated above.

Accordingly, when the sensor system according to the present invention is employed, an ability for acquiring information of avoiding collisions in mobile robots can remarkably be improved.

Particularly, when a detection means for a moving obstacle is combined with the detection means involved in the sensor system according to the present invention, it becomes possible to acquire all the information required for avoiding collisions.

Furthermore, in the present mode for embodiment, when parameters dependent upon hardware are allowed to vary thereby changing signal intensity of infrared signals to be sent, it is possible to change a communicable range, a detection range for obstacles, and a detection range for interference.

Since the present invention has been constituted as described above, there is such an excellent advantage in that detection of mobile robots and obstacles by the use of infrared communications becomes possible for the sake of avoiding collisions of the mobile robots.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A mobile robot system comprising: a plurality of mobile robots, each mobile robot including:
    an infrared transmitter for transmitting data;
    a infrared receiver for receiving data; and
    a controller for preparing data to be transmitted by said infrared transmitter and for interpreting data received by said infrared receiver, wherein said data includes identification information unique to the mobile robot transmitting said data.

2. The mobile robot system of claim 1, wherein said data also includes travel information descriptive of movements for the mobile robot transmitting said data.

3. The mobile robot system of claim 2, wherein said travel information includes a direction of travel and a speed of travel for the mobile robot transmitting said data.

4. The mobile robot system of claim 3, wherein said data are in binary, each bit of said data being represented as either an "on" pulse representing a "1" or an "off" pulse representing a "0", and each bit of said data being preceded by an "on" pulse, having a width equal to a width of a bit of data, and being used for synchronization, and each bit of said data being followed by an "off" pulse, having a width equal to the width of a bit of data, and being used for detecting interference.

5. The mobile robot system of claim 3, wherein each mobile robot is capable of moving and stopping arbitrarily.

6. The mobile robot system of claim 5, wherein said transmitter, of each mobile robot, is a luminous element for transmitting infrared signals and said receiver, of each mobile robot, is a photoreceptive element for receiving infrared signals.

7. The mobile robot system of claim 3, wherein said transmitter, of each mobile robot, is a luminous element for transmitting infrared signals and said receiver, of each mobile robot, is a photoreceptive element for receiving infrared signals.

8. The mobile robot system of claim 2, wherein said data are in binary, each bit of said data being represented as either an "on" pulse representing a "1" or an "off" pulse representing a "0", and each bit of said data being preceded by an "on" pulse, having a width equal to a width of a bit of data, and being used for synchronization, and each bit of said data being followed by an "off" pulse, having a width equal to the width of a bit of data, and being used for detecting interference.

9. The mobile robot system of claim 2, wherein each mobile robot is capable of moving and stopping arbitrarily.

10. The mobile robot system of claim 9, wherein said transmitter, of each mobile robot, is a luminous element for transmitting infrared signals and said receiver, of each mobile robot, is a photoreceptive element for receiving infrared signals.

11. The mobile robot system of claim 2, wherein said transmitter, of each mobile robot, is a luminous element for transmitting infrared signals and said receiver, of each mobile robot, is a photoreceptive element for receiving infrared signals.

12. The mobile robot system of claim 1, wherein said data are in binary, each bit of said data being represented as either an "on" pulse representing a "1" or an "off" pulse representing a "0", and each bit of said data being preceded by an "on" pulse, having a width equal to a width of a bit of data, and being used for synchronization, and each bit of said data being followed by an "off" pulse, having a width equal to the width of a bit of data, and being used for detecting interference.

13. The mobile robot system of claim 12, wherein each mobile robot is capable of moving and stopping arbitrarily.

14. The mobile robot system of claim 12, wherein said transmitter, of each mobile robot, is a luminous element for transmitting infrared signals and said receiver, of each mobile robot, is a photoreceptive element for receiving infrared signals.

15. The mobile robot system of claim 1, wherein each mobile robot is capable of moving and stopping arbitrarily.

16. The mobile robot system of claim 15, wherein said transmitter, of each mobile robot, is a luminous element for transmitting infrared signals and said receiver, of each mobile robot, is a photoreceptive element for receiving infrared signals.

17. The mobile robot system of claim 1, wherein said transmitter, of each mobile robot, is a luminous element for transmitting infrared signals and said receiver, of each mobile robot, is a photoreceptive element for receiving infrared signals.

18. The mobile robot system of claim 1, wherein said transmitter, of each mobile robot, includes a plurality of transmitters spaced around a periphery of the mobile robot, and said receiver, of each mobile robot, includes a plurality of receivers spaced around the periphery of the mobile robot.

19. The mobile robot system of claim 18, wherein said plurality of transmitters equals eight and said plurality of receivers equals eight.

20. The mobile robot system of claim 18, wherein each of said plurality of receivers is capable of receiving a data transmission from each of said plurality of transmitters, of another mobile robot.

* * * * *